(12) United States Patent
Goitsuka et al.

(10) Patent No.: US 6,199,275 B1
(45) Date of Patent: Mar. 13, 2001

(54) METHOD FOR FORMING CRANK SHAFT AND METHOD FOR PRODUCING CRANK SHAFT

(75) Inventors: Takashi Goitsuka; Kouji Nemoto, both of Tochigi-ken; Masahiko Ryu, Mooka; Yoshikatsu Nozawa, Tochigi-ken, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/306,999

(22) Filed: May 7, 1999

(30) Foreign Application Priority Data

May 19, 1998 (JP) .................................. 10-136902

(51) Int. Cl.$^7$ .................................. B23D 15/00
(52) U.S. Cl. .................................. 29/888.08; 29/888.02
(58) Field of Search .................................. 29/888.08, 888.02; 74/595, 596, 597, 598

(56) References Cited

U.S. PATENT DOCUMENTS

| | | | | |
|---|---|---|---|---|
| 1,403,696 | * | 1/1922 | Larcher | 29/888.08 |
| 1,434,215 | * | 10/1922 | Larcher | 29/888.08 |
| 2,662,267 | * | 12/1953 | Nelson | 29/888.08 |
| 4,269,551 | * | 5/1981 | Kralowetz | 29/888.08 |
| 5,131,143 | * | 7/1992 | Kirchburger | 29/888.08 |
| 5,207,120 | * | 5/1993 | Arnold et al. | 29/888.08 |
| 5,303,468 | * | 4/1994 | Cieszkiewicz et al. | 29/888.08 |
| 5,625,945 | * | 5/1997 | Paso | 29/888.08 |

\* cited by examiner

*Primary Examiner*—I Cuda Rosenbaum
(74) *Attorney, Agent, or Firm*—Birch, Stewart, Kolasch & Birch, LLP

(57) ABSTRACT

A steel material having a columnar configuration is subjected to forming by applying finishing processing performed after buster processing and coarse (preliminary) processing to obtain a configuration in which additive metal lump portions are combined with upper and lower portions of a shaft section having a circular cross section. In the following trimming processing, a shaft section is formed to have a configuration in which eliminative metal lump portions are cut and eliminated from right and left sides of the shaft section. In the following sizing processing, plastic flow is allowed to occur from the additive metal lump portions to the eliminative metal lump portions to obtain a shaft section having a circular cross section. When the shaft section is formed by effecting the processing steps as described above, a method for forming crank shafts and a method for producing crank shafts can be obtained, which make it possible to decrease the number of processing steps so that the processing cost is reduced and the processing time is shortened.

8 Claims, 4 Drawing Sheets

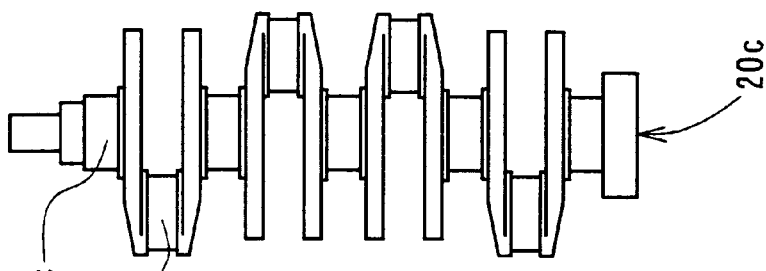
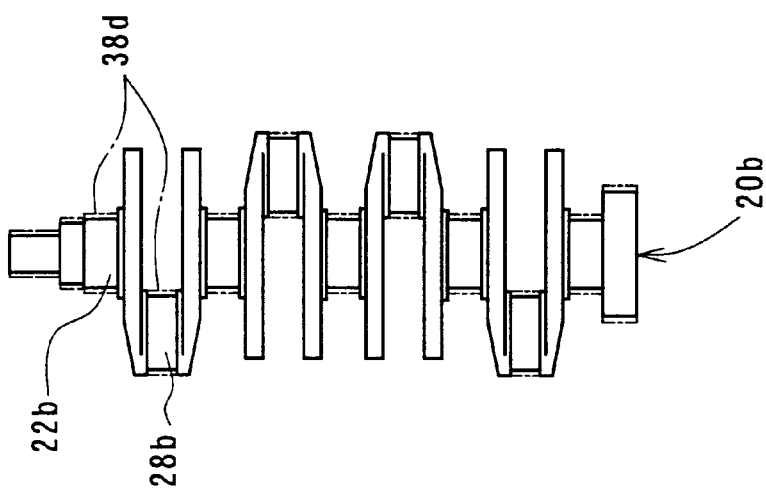
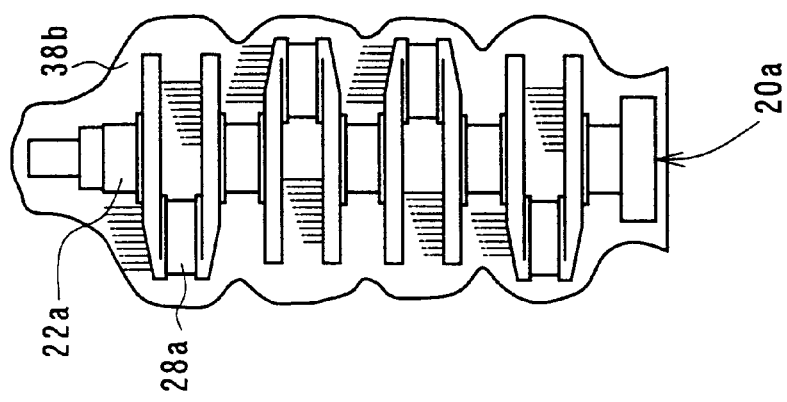
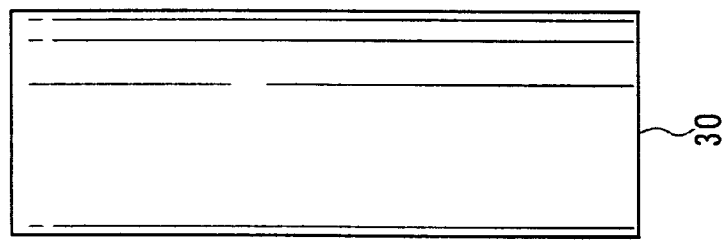

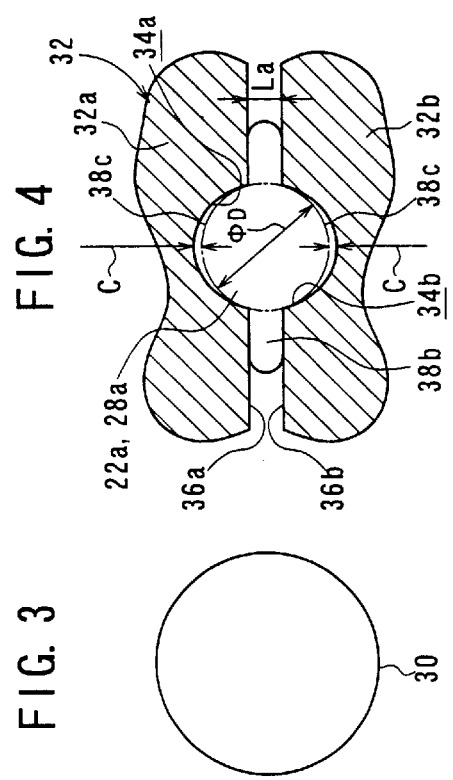
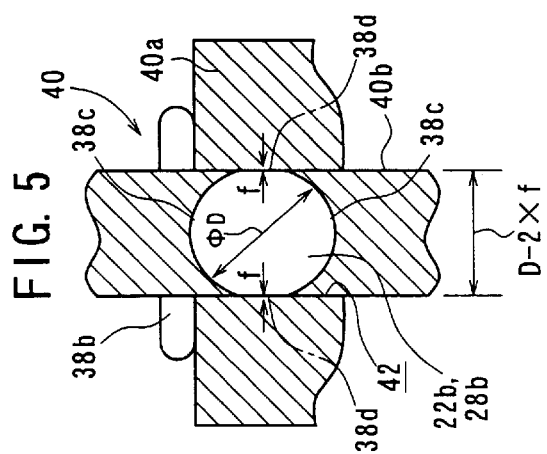
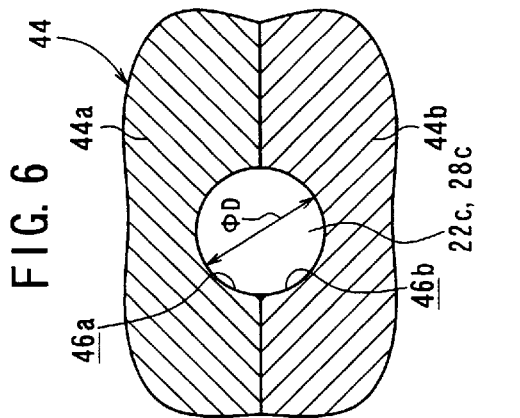
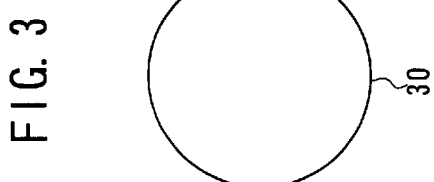

METHOD FOR FORMING CRANK SHAFT AND METHOD FOR PRODUCING CRANK SHAFT

BACKGROUND OF THE INVENTION

1. Field of the Invention

The present invention relates to a method for forming crank shafts and a method for producing crank shafts, which make it possible to reduce the processing cost and shorten the processing time by decreasing the number of processing steps.

2. Description of the Related Art

Conventionally, the crank shaft to be used as an automobile part has been produced such that a steel material having a columnar configuration, which has been cut into a predetermined length, is subjected to the forging, followed by the cutting processing step.

The steps for producing the crank shaft concerning the conventional technique will be briefly explained below, taking notice of the processing performed for a shaft and a crank pin (referred to as "shaft section") which constitute the crank shaft.

At first, a steel material, which has been heated to have a red-heated appearance, is subjected to the buster processing and the coarse (preliminary) processing, followed by performing the finishing processing. In the finishing processing, as shown in FIG. 7, a first intermediate formed product 7a is obtained by means of the forging processing based on the use of an upper die 1a and a lower die 1b. The upper die 1a and the lower die 1b comprise recesses 3a, 3b for forming a space having a substantially columnar configuration with a diameter φD therebetween when they make nearest approach to one another during the processing, and planar sections 5a, 5b disposed on both sides of the recesses 3a, 3b which are opposed to one another while leaving a spacing distance La therebetween.

The first intermediate formed product 7a, which is obtained by the finishing processing, has a columnar section 9 having the diameter φD corresponding to the recesses 3a, 3b and a burr 11 corresponding to the planar sections 5a, 5b. The thickness of the burr 11 is La. In this case, the diameter φD is a value obtained by adding a predetermined machining allowance "a" to a diameter φd of the shaft section of the crank shaft. That is, there is given φD=φd+2×a. The reason why the first intermediate formed product 7a is specially formed is that it is intended not to allow the inside of the formed product to be sparse by applying the processing to the steel material which is sufficient to obtain the fluidity of the lump during the forming process.

Subsequently, the trimming processing is performed. In the trimming processing, as shown in FIG. 8, the columnar section 9 is stamped out from the first intermediate formed product 7a placed on a die 13a by using a punch 13b to obtain a second intermediate formed product 7b. In this case, the width dimension of a hole 15 provided for the die 13a has a value obtained by adding a predetermined machining allowance "b" to the diameter φD, i.e., D+2×b. As shown in FIG. 9, the second intermediate formed product 7b, which is obtained by the trimming processing, has a shape including a burr 11 having a burr height (with the value "b" as well) which remains on the columnar section 9 corresponding to the machining allowance "b".

Subsequently, the second intermediate formed product 7b is subjected to the restriking to correct the bending of the shaft generated when the respective processing steps are performed as described above.

Subsequently, the cutting processing (lace processing) is performed to obtain a third intermediate formed product (not shown) from which a part of the machining allowance "a" and the burr height "b" have been removed. Subsequently, the soft nitriding treatment (tufftride treatment) or the local high frequency heat treatment is applied thereto, and then the finishing polishing processing is performed. Thus, the remaining portion of the machining allowance "a" is removed to obtain the crank shaft including the shaft section which has the diameter φd.

In the finishing processing described above, the upper die 1a and the lower die 1b do not make abutment with each other. That is, the gap of the spacing distance La exists between the upper die 1a and the lower die 1b. For this reason, it is feared that the thickness of the first intermediate formed product 7a may involve any dispersion. Further, it is feared that any deviation may occur between the portion (upper portion) of the first intermediate formed product 7a corresponding to the upper die 1a and the portion (lower portion) of the first intermediate formed product 7a corresponding to the lower die 1b, on the basis of the positional deviation between the upper die 1a and the lower die 1b.

When the finishing processing is performed, the steel material is heated to have a red-heated appearance. Further, the processing often brings about an amount of deformation of the steel material. Furthermore, the steel material has a heavy weight, and it has a columnar configuration which is long in the axial direction. Therefore, the steel material undesirably bites into the upper die 1a and the lower die 1b during the finishing processing. A large force is required to perform the operation (ejecting operation) for removing the steel material (first intermediate formed product 7a) from the upper die 1a and the lower die 1b. As a result, any deformation including, for example, bending of the axis occurs due to the force which is applied to the first intermediate formed product 7a during the ejecting operation. That is, there is a possibility that the axis may be bent at the columnar section 9 of the first intermediate formed product 7a. Further, a large shearing force is applied to the columnar section 9 when the trimming processing is performed. Therefore, it is feared that the axis of the columnar section 9 may be also bent by the shearing force.

Even when the restriking is effected for the second intermediate formed product 7b in which the deformation has occurred as described above, for example, any springback takes place. For this reason, it is impossible to completely correct the deformation. Therefore, in order to obtain the third intermediate formed product having the columnar section 9 in which the cross section is a perfect circle and no bending occurs in the axis, the following procedure is required. That is, it is necessary that the machining allowance "a", which is provided for the columnar section 9, is previously set to have a large value while considering the deviation and the bending of the axis generated in the columnar section 9, and the machining allowance "a" is removed by means of the cutting processing.

Further, the burr 11 having the predetermined burr height "b" remains in the second intermediate formed product 7b. Therefore, it is necessary that the cutting processing is performed to remove the burr 11 as well.

As described above, in the process for producing the crank shaft concerning the conventional technique, it is necessary that the machining allowance "a" and the burr 11, which have been provided to be large, are removed by means of the cutting processing. Therefore, inconveniences arise in that the production cost and the processing time for the crank shaft are increased.

SUMMARY OF THE INVENTION

The present invention relates to a method for forming crank shafts and a method for producing crank shafts in order to dissolve the inconveniences as described above, an object of which is to provide a method for forming crank shafts and a method for producing crank shafts, which make it possible to decrease the number of processing steps so that the production cost is reduced and the production time is shortened for the crank shaft.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2A shows a steel material having a columnar configuration;

FIG. 2B shows a first intermediate formed product to produce the crank shaft;

FIG. 2C shows a second intermediate formed product to produce the crank shaft;

FIG. 2D shows a third intermediate formed product to produce the crank shaft;

FIG. 3 shows a sectional view illustrating the steel material having the columnar configuration;

FIG. 4 shows a sectional view illustrating dies used in the finishing processing and the first intermediate formed product for the crank shaft;

FIG. 5 shows a sectional view illustrating dies used in the trimming processing and the second intermediate formed product for the crank shaft;

FIG. 6 shows a sectional view illustrating dies used in the sizing processing and the third intermediate formed product for the crank shaft;

DESCRIPTION OF THE PREFERRED EMBODIMENTS

An embodiment of the present invention will be explained in detail below with reference to the accompanying drawings.

At first, explanation will be made for a crank shaft to which the embodiment of the present invention is applied.

Figure 1:
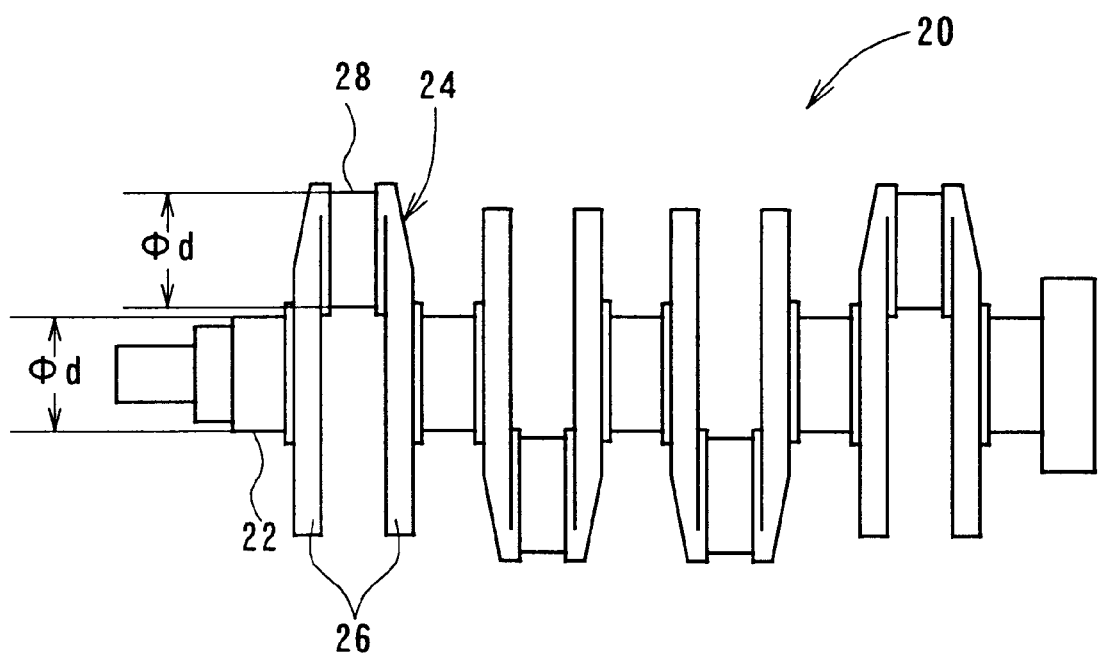
FIG. 1 shows a crank shaft to which an embodiment of the present invention is applied.
Figure 9:
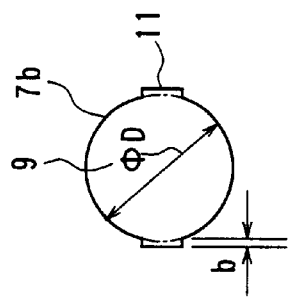
FIG. 9 shows a sectional view illustrating the second intermediate formed product for the crank shaft concerning the conventional technique.
Figure 8:
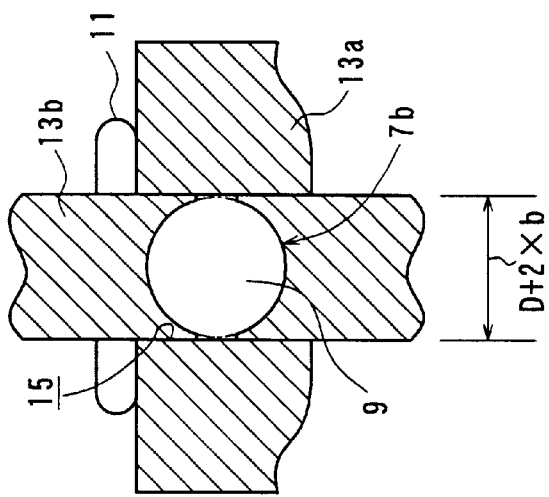
FIG. 8 shows a sectional view illustrating dies used in the trimming processing concerning the conventional technique and a second intermediate formed product for the crank shaft.
Figure 7:
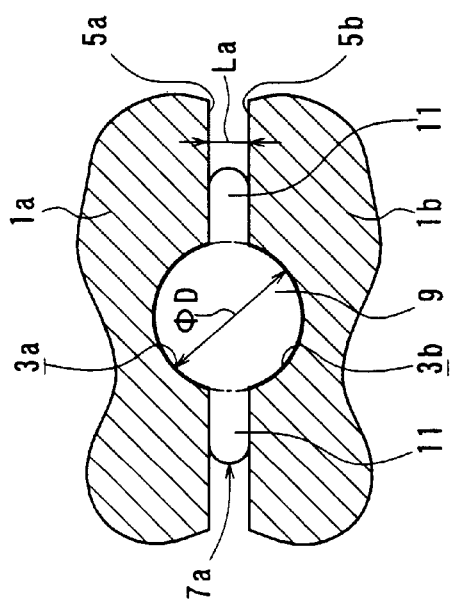
FIG. 7 shows a sectional view illustrating dies used in the finishing processing concerning the conventional technique and a first intermediate formed product for a crank shaft.

As shown in FIG. 1, the crank shaft 20 includes a plurality of crank sections 24 which are provided along a shaft 22. Each of the crank sections 24 comprises a pair of arms 26 and a crank pin 28 which is formed to be interposed between the arms 26. The crank pin 28 is slidably coupled to an unillustrated connecting rod. Therefore, the crank pin 28 is formed to have a circular cross section. The shaft 22 is rotatably supported by unillustrated bearing members. Therefore, the shaft 22 is formed to have a circular cross section in the same manner as the crank pin 28. In order to obtain a better understanding of this embodiment, both of the diameters of the shaft 22 and the crank pin 28 are $\phi d$, and the shaft 22 and the crank pin 28 are simply referred to as "shaft sections 22, 28".

Next, the embodiment of the present invention will be explained, principally taking notice of the steps of forming the shaft 22 and the crank pin 28 (shaft sections 22, 28) of the crank shaft 20.

At first, a steel material 30 having a columnar configuration, which has been cut to have a predetermined length as shown in FIGS. 2A and 3, is heated. The steel material 30, which has been heated to have a red-heated appearance, is subjected to the buster processing and the coarse (preliminary) processing followed by the finishing processing (first forging processing step).

As shown in FIG. 4, an upper die 32a and a lower die 32b, which constitute a die 32 to be used for the finishing processing, comprise recesses 34a, 34b for forming a space corresponding to the crank shaft 20 (shaft sections 22, 28 in the embodiment shown in FIG. 4) between the upper die 32a and the lower die 32b when they make nearest approach to one another during the processing. Specifically, the recesses 34a, 34b form the space having an elliptic cross section in which the dimension (width dimension) in the lateral direction (widthwise direction) in FIG. 4 is $\phi D$, and the dimension (thickness dimension) in the vertical direction (thickness direction) is $\phi D + 2 \times c$ obtained by adding a predetermined length "c" doubly for upper and lower portions to the width dimension $\phi D$. Planar sections 36a, 36b, which are opposed to one another with a spacing distance La intervening therebetween, are provided on both sides of the recesses 34a, 34b of the upper die 32a and the lower die 32b respectively.

A first intermediate formed product (referred to as "crank shaft 20a") to produce the crank shaft 20 is obtained by the finishing processing which is the forging processing based on the use of the upper die 32a and the lower die 32b. As shown in FIG. 2B, the crank shaft 20a has a burr 38b which is formed by the planar sections 36a, 36b (see FIG. 4) of the upper die 32a and the lower die 32b. On the other hand, as shown in FIG. 4, the portions of the crank shaft 20a (referred to as "shaft sections 22a, 28a") corresponding to the shaft sections 22, 28 are formed to have an elliptic cross section having a width dimension of $\phi D$ and a thickness dimension of $\phi D + 2 \times c$. That is, the cross section of each of the shaft sections 22a, 28a has a shape obtained such that an additive metal lump portion 38c, which has the maximum value of the thickness of "c" in the direction perpendicular to the axis of the shaft sections 22a, 28a, is doubly combined with upper and lower portions of the circle having the diameter $\phi D$. The diameter $\phi D$ has a value obtained by adding a predetermined machining allowance "e" to the diameter $\phi d$ of the crank pin 28 (see FIG. 1). That is, there is given $\phi D = \phi d + 2 \times e$. Subsequently, the crank shaft 20a is subjected to the trimming processing (stamping processing step). As shown in FIG. 5, a jig 40 to be used in the trimming processing comprises a die 40a and a punch 40b. The die 40a is provided with a hole 42 corresponding to the shaft sections 22a, 28a. The width dimension of the hole 42 is set to be shorter than the width dimension $\phi D$ of the shaft sections 22a, 28a by a predetermined length "f" on both right and left sides respectively. That is, the width dimension of the hole 42 is D−2×f. The burr 38b is cut and separated from the crank shaft 20a by means of the trimming processing effected by using the die 40*a* and the punch 40*b* of the jig 40 to obtain a second intermediate formed product (referred to as "crank shaft 20*b*") to produce the crank shaft 20 as shown in FIG. 2C. As shown in FIG. 5, the width dimension of each of the portions of the crank shaft 20*b* (referred to as "shaft sections 22*b*, 28*b*") corresponding to the shaft sections 22, 28 is D−2×f. That is, the cross section of each of the shaft sections 22*b*, 28*b* has such a shape that the additive metal lump portion 38*c* is combined with upper and lower portions of the circle having the diameter φD, and an eliminative metal lump portion 38*d*, which has the maximum value of the thickness of "f", is cut and eliminated (removed as an eliminative metal lump) along planes perpendicular to the lateral direction (widthwise direction) in FIG. 5, on both right and left sides respectively. The cross-sectional area of the eliminative metal lump portion 38*d* in FIG. 5 is set to be approximately the same as the cross-sectional area of the additive metal lump portion 38*c*.

Subsequently, the sizing processing is performed (second forging processing step). As shown in FIG. 6, an upper die 44*a* and a lower die 44*b*, which constitute a die 44 to be used in the sizing processing, include recesses 46*a*, 46*b* for forming a space corresponding to the crank shaft 20 (shaft sections 22, 28 in the embodiment shown in FIG. 6) between the upper die 44*a* and the lower die 44*b* when they make abutment with each other during the processing. Specifically, the recesses 46*a*, 46*b* form the space with a circular cross section having a diameter φD.

A third intermediate formed product (referred to as "crank shaft 20*c*") to produce the crank shaft 20 as shown in FIG. 2D is obtained by means of the sizing processing which is the forging processing based on the use of the upper die 44*a* and the lower die 44*b*. As shown in FIG. 6, the portions of the crank shaft 20*c* (referred to as "shaft sections 22*c*, 28*c*") corresponding to the shaft sections 22, 28 are formed to have a circular cross section with the diameter φD. That is, the plastic flow occurs in the sizing processing from the additive metal lump portion 38*c* to the eliminative metal lump portion 38*d* shown in FIG. 5. Thus, a perfect circle is formed. Further, the bending of the axis of the crank shaft 20*c* is corrected owing to the sizing processing.

Subsequently, the soft nitriding treatment (tufftride treatment) or the local high frequency heat treatment is applied, and then the polishing processing is applied to the shaft sections 22*c*, 28*c* of the crank shaft 20*c* to cut and remove the machining allowance "e". Thus, the crank shaft 20 including the shaft sections 22, 28 having the diameter φd is obtained (polishing processing step).

Next, explanation will be made for examples of specified dimensions of the crank shaft 20 and the intermediate formed products thereof (crank shafts 20*a*, 20*b*, 20*c*).

When the diameter φd of each of the shaft sections 22, 28 is 55 mm, the machining allowance "e" is 1 mm. That is, the width dimension φD of each of the shaft sections 22*a*, 28*a* is 57 mm. The maximum value "c" of the thickness of the additive metal lump portion 38*c* is 0.7 mm, and the maximum value "f" of the eliminative metal lump portion 38*d* is 0.3 mm. That is, the thickness dimension of each of the shaft sections 22*a*, 28*a* and the shaft sections 22*b*, 28*b* is 58.4 mm, and the width dimension of each of the shaft sections 22*b*, 28*b* is 56.4 mm. When the diameter of the crank pin 28 is different from that of the shaft 22, for example, the dimension such as machining allowance for each of them may be determined on the basis of the dimension ratio as exemplified for the case in which the shaft sections 22, 28 have the same diameter.

As described above, in the embodiment of the present invention, the shaft sections 22*a*, 28*a* of the crank shaft 20*a*, which are obtained by the finishing processing, are formed to have the elliptic cross section provided with the additive metal lump portions 38*c*. The shaft sections 22*b*, 28*b* of the crank shaft 20*b*, which are obtained by the trimming processing for the crank shaft 20*a*, are formed to have the shape in which the eliminative metal lump portions 38*d* are cut and removed from the shaft sections 22*a*, 28*a*. The shaft sections 22*c*, 28*c* of the crank shaft 20*c*, which are obtained by the sizing processing for the crank shaft 20*b*, are formed to have the circular cross section.

The crank shaft 20 is formed by effecting the processing steps described above (the finishing processing step, the trimming processing step, and the sizing processing step). Thus, the shaft sections 22*c*, 28*c* each having the circular cross section, in which no burr 38*b* remains, can be obtained without performing any cutting processing. When the sizing processing is performed, the bending of the axis of the crank shaft 20*c* is corrected as well. Accordingly, it is possible to decrease the number of processing steps. Thus, it is possible to reduce the processing cost and shorten the processing time.

As explained above, according to the present invention, it is possible to obtain a method for forming crank shafts and a method for producing crank shafts, which make it possible to decrease the number of processing steps so that the processing cost is reduced and the processing time is shortened.

What is claimed is:

1. A method for forming crank shafts, comprising the steps of:

cutting a steel material having a columnar configuration to a predetermined length;

performing buster and coarse processing on said steel material;

performing finishing processing on said steel material, wherein said finishing processing comprises forming a shaft section of said crank shaft such that a cross sectional configuration thereof comprises a substantially circular shape of a predetermined diameter including an additive metal lump portion and a burr extending in a widthwise direction;

performing trimming processing on said steel material, said trimming processing further comprising removing a portion of said shaft section made up of said burr and an eliminative metal lump; and performing sizing and processing on said steel material by allowing a plastic flow to occur from said additive metal lump portion to a space created by removal of the eliminative metal lump in said trimming processing, thereby causing said shaft section to develop a circular cross section having said predetermined diameter.

2. The method according to claim 1, wherein said shaft section after said finishing step has an elliptical cross section.

3. The method according to claim 1, wherein a cross sectional area of said additive metal lump portion substantially equals a cross sectional area of the eliminative metal lump removed in said trimming processing.

4. The method according to claim 1, wherein said shaft section of said crank shaft includes a shaft and a crank pin.

5. A method for producing crank shafts, comprising the steps of:

cutting a steel material having a columnar configuration to a predetermined length;

performing a first forging on said steel material to obtain a first intermediate formed product, said first forging comprising the sub-steps of (a) performing buster and coarse processing on said steel material and (b) performing finishing processing on said steel material, wherein said finishing processing comprises forming a shaft section of said crank shaft such that a cross sectional configuration thereof comprises a substantially circular shape of a predetermined diameter with a matching allowance, and additive metal lump portion and a burr extending in a widthwise direction;

performing a stamping process on said first intermediate formed product, said stamping process comprising removing a portion of said shaft section made up of said burr and an eliminative metal lump, thereby obtaining a second intermediate formed product;

performing a second forging on said second intermediate formed product, said second forging comprising causing a plastic flow to occur from said additive metal lump portion to a space created by removal the eliminative metal lump in said stamping process, thereby causing said shaft section to develop a circular cross section having said predetermined diameter and obtaining a third intermediate formed product; and polishing at least said shaft section of said third intermediate formed product to remove said machining allowance, thereby obtaining said crank shaft in which said shaft section thereof has a circular cross section.

6. The method according to claim 5, wherein said shaft section after said first forging step has an elliptical cross section.

7. The method according to claim 5, wherein a cross sectional area of said additive metal lump portion substantially equals a cross sectional area of the eliminative metal lump removed in said stamping process.

8. The method according to claim 5, wherein said shaft section of said crank shaft includes a shaft and a crank pin.

* * * * *